9112X
STAHL & DIEFFENBACHER.
Cultivator.
Patented Sept. 18, 1835.
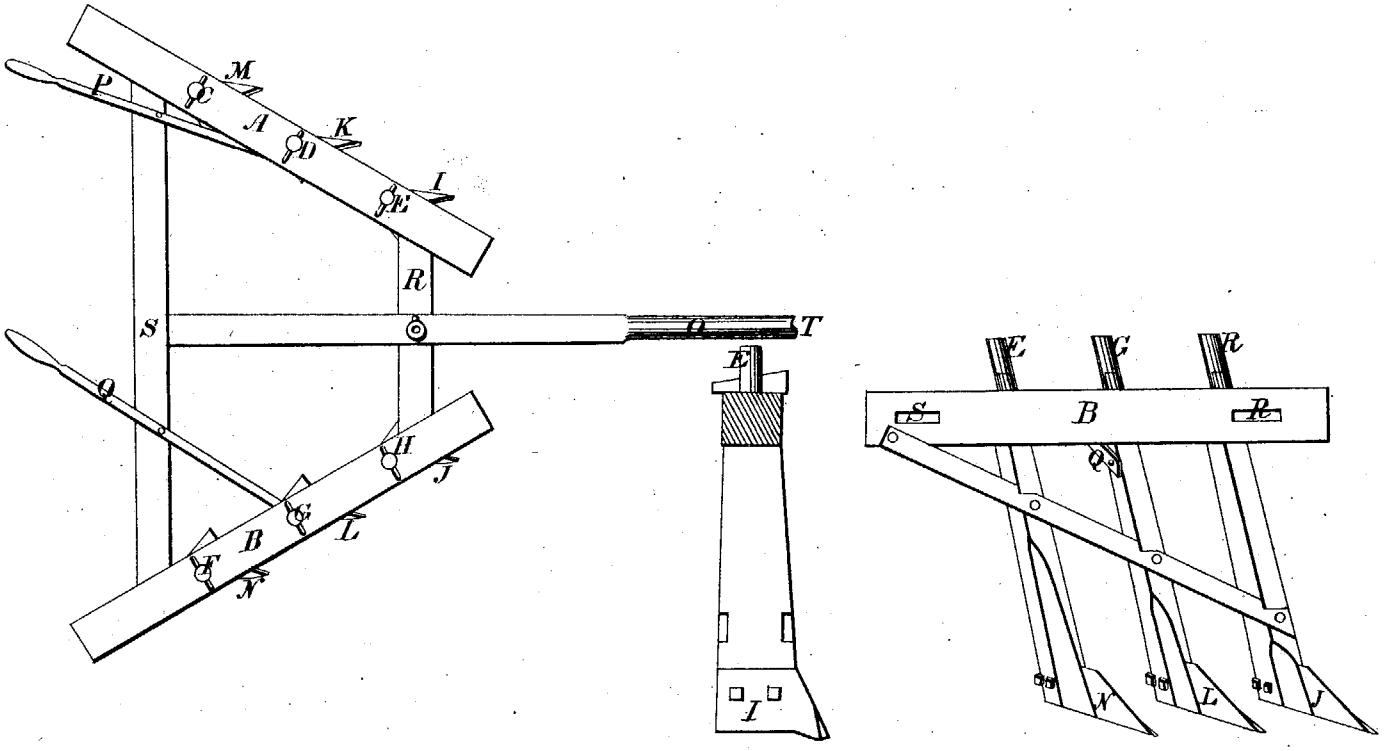
AM. PHOTO-LITHO. CO. N.Y. (OSBORNE'S PROCESS.)

Sept. 18. 1835

Peter Stahl & John Dieffenbacker of Turbot Township, Penn,

Letters Patent,

The schedule referred to in these Letters Patent and making part of the same, containing a description in the words of the said Peter Stahl & John Dieffenbacker themselves of their improvement in the Plough To all to whom these presents shall come, Be it known that we Peter Stahl & John Dieffenbaker both of Turbut township in the County of Northhumberland and State of Pennsylvania have invented, a new and useful improvement in the Plough and that the following is a full and exact description of the construction and operation of the said Machine as invented or improved by us. The Plough is for the purpose of cultivating Corn and Potatoes, and consists of two beams A, B, fastened together in a triangular manner into each of which are fastened securely three standards C, D, E, F, G, H, on the lower end of each of which an iron sheer or mould-board is securely fastened, and the whole placed in such a manner in relation to each other, that when the plough is drawn along over the row of corn or potatoes there will be three of the abovementioned sheers or mould boards on each side of the said row, the two first or foremost ones I, J, throwing the earth up against the corn, the two second or next K, L, throw-ing the earth which is before them into the furrows caused by the two first and the last or third sheers M. N, throwing the earth which is before them into the furrows caused by the two second On the top of the Plough a tongue O. is securely fastened extending beyond the plough a sufficient length to allow, of two horses being attached thereto, one on each side for the purpose of drawing and guiding the same; and also on the hinder part of the Plough two handles P. Q, are placed for the convenience of the ploughman in regulating and using the same for the purposes designed, Each of the beams should be made about three feet three inches in length, about three by four inches thick, and framed together by two bars one at each end of the plough, the formost one R. being about three inches wide and two and a half inches thick, and of such a length as to bring the heels of the two fore sheers or mould boards about fourteen inches apart — and the hindmost bar S being of the same thickness as the fore one and of such a length as to bring the heels of the two hind most sheers or mould boards about three feet apart, — The standards C.D, E.F, G.H, should each extend about twenty one inches from the bottoms of the beams, and so framed into the latter as to slant forwards at the bottom about two and a half inches from a perpendicular line to the beams; and should be about one and three quarters of an inch thick and about six inches wide. The iron sheers or mould boards should be about eight inches long and about five inches deep fastened on to the standards by two screws passing through each, and of such a shape, and placed in such a manner upon the four sides of the lower ends of the standards, so that when the plough is drawn by the horses in a line, with, and over the row of corn or potatoes, the earth, before each will be thrown towards the said rows. For a particular idea of the shape & relative situation of the sheers and standards reference can be had to the model, the inclination of the face of each of the standards however should be at an angle of about fifteen degrees to the outside of the beams, or in other words at an angle of about eighty degrees in relation to each other on the two sides of the plough. The tongue O. is fastened to the centre of each of the cross-bars R. & S. and should be about ten and a half feet in the whole length, and about three inches square at the hind most end and about two and a half inches in diameter at the fore end, It should be placed nearly horizontal, but raised or lowered as occasion may require, by means of a small block, which can be placed either under or in the upper side of the tongue and secured in either situation by means of a draw bolt, which passes through the same and secures them to the centre of the forebar R, each handle should be fastened to the hindmost bar and to the middle standard of each beam both inclining to left side of the plough the left handle being about two and a half feet and the right one about three feet in length. The horses should be attached to the plough by means of a double tree fastened in the lower side of the tongue at T. What we claim as our own invention and not previously known in the above described machine, are first the sheers or mould boards (which are each cast in one piece and forming a coulter sheer & mould board) second, the high standards C, D, E, F, G, H, which carry the plough beams so far above the corn or potatoes as not to break it down so long as it needs cultivating. And third the placing them in such a manner as to plough or cultivate both sides of a row of corn or potatoes at one and the same time of going over the same, we do not restrict the number ~~the~~ of sheers or mould boards and standards to three on each side of the plough as their number must be increased or diminished as the distance between the rows of corn or potatoes is increased or diminished Witnesses
Jas. Bound
Robt. Bennet Peter Stahl
John Dieffenbacker Exd
Ch. H 972 wds (Drawing.)